United States Patent [19]

Tsuda

[11] Patent Number: 5,017,929

[45] Date of Patent: May 21, 1991

[54] ANGLE OF ARRIVAL MEASURING TECHNIQUE

[75] Inventor: George I. Tsuda, Fullerton, Calif.

[73] Assignee: Hughes Aircraft Company, Los Angeles, Calif.

[21] Appl. No.: 403,426

[22] Filed: Sep. 6, 1989

[51] Int. Cl.$^5$ .................. G01S 5/02; G01S 13/00; G01S 3/16

[52] U.S. Cl. .................. 342/427; 342/157; 342/378

[58] Field of Search ............ 342/427, 422, 154, 157, 342/378

[56] References Cited

U.S. PATENT DOCUMENTS

3,438,044  4/1969  Elia et al. ........................... 342/427
4,599,622  8/1986  Haupt .................................. 342/427

*Primary Examiner*—Gregory C. Issing
*Attorney, Agent, or Firm*—Wanda K. Denson-Low

[57] ABSTRACT

An improved angle of arrival measurement technique for monopulse antenna systems employing phase shifters on each of the four feeds to resolve ambiguities and to increase the beam splitting (angle of arrival) accuracy. To resolve ambiguities, the phase shifters are employed to shift or steer the sum and difference beams a predetermined angular amount relative to a signal of interest, and the resulting change in the angle of arrival of the returned signal is noted. The position of the original signal, as displayed on an output device, such as a radar display, for example, is then compared with the position of the signal received with respect to the shifted beam. This comparison reveals whether a true signal has been received or not. If the signal of interest is intercepted in the main beam, then the position thereof after the beam has been steered remains in the main lobe of the beam, and hence the signal of interest remains detected. However, if the signal of interest is in the sidelobe, it disappears from the radar display and is not detected.

8 Claims, 6 Drawing Sheets

ANGLE OF ARRIVAL MEASURING TECHNIQUE

BACKGROUND

The present invention relates generally to angle of arrival measuring systems and, in particular, monopulse microwave systems having angle of arrival measuring capability.

Prior art antenna systems typically have a problem distinguishing between signals that are detected with the main beam and signals that are detected with a sidelobe, commonly known as angle of arrival ambiguity. Conventional monopulse radar tracking systems generate angle error signals, but do not use phase shifters to shift the antenna beam to resolve ambiguity of the angle error signals or increase the angle of arrival accuracy. Phased array systems and beamforming systems use phase shifters to phase shift the received signal. However, such systems are primarly arranged for steering a beam, not for increasing the angle of arrival accuracy or resolving ambiguity of the angle of arrival signals.

Accordingly, in order to overcome the limitations of conventional systems, it is a feature of the present invention to provide a method and apparatus for angle of arrival determination having broadband capability, that more precisely measures the angle of arrival of target returns signal, and that resolves sidelobe ambiguity.

SUMMARY OF THE INVENTION

Accordingly, the present invention provides an improved angle of arrival measurement technique for monopulse antenna systems employing phase shifters on each of the four feeds to resolve ambiguities and to increase the beam splitting (angle of arrival) accuracy. To resolve ambiguities, the phase shifters are employed to shift or steer the sum and difference beams a predetermined angular amount relative to a supposed event or signal of interest, and the resulting change in the angle of arrival of the returned signal is noted. Such beam shifting causes the angle of arrival signals associated with the main beam and with the sidelobes to be shifted unequally since the main beam is wider than the sidelobes. The position of the original signal, as displayed on a radar display, for example, is then compared with the position of the signal received with respect to the shifted beam. The comparison reveals whether a true signal has been received or not. If the signal of interest is intercepted in the main beam, then the position thereof after the beam has been steered, say by one-half a beam, for example, remains in the main lobe of the beam, and hence the signal of interest remains detected. However, if the signal of interest is in the sidelobe, it disappears from the radar display and is not detected. The present invention thus provides a new and improved method and arrangement to resolve angle of arrival ambiguity. In addition, by providing multiple beam shifts and subsequent multiple measurements that are a function of multiple phase shift conditions, improved angle of arrival accuracy is obtained.

BRIEF DESCRIPTION OF THE DRAWINGS

The various features and advantages of the present invention will become apparent from the following detailed description taken in conjunction with the accompanying drawings, wherein like reference numerals designate like structural elements, and in which.

DETAILED DESCRIPTION

By way of introduction, radar systems are discussed in detail in the *Radar Handbook* by Skolnik (McGraw Hill, 1970) and *Antenna Engineering Handbook* by Johnson et al. (McGraw Hill, 1984) which are herein incorporated by reference. The Skolnik book provides a particularly pertinent description in chapter 21. For example, monopulse radars (page 21-4 et seq) are shown implemented with multiple quadrature feed horns having arrangements for generating sum and difference microwave signals in FIGS. 14 to 21 for subsequent signal processing. Skolnik's FIG. 15 shows a conventional monopulse tracking radar having four feed horns generating four signals to hybrid junction elements (shown as circles) which generate a sum channel signal ($\Sigma$), an elevation difference channel signal ($\Delta$), and an azimuth difference channel signal ($\Delta$) to mixers, IF amplifiers, and detectors. Similarly, the Johnson book provides a particularly pertinent description in chapter 34. In order to reduce angle of arrival ambiguity, such prior art systems often implement some form of sidelobe blanking, such as implementing a relatively low gain antenna in conjunction with the main antenna. Any comparison showing greater signal levels in the low gain channels are canceled, thus eliminating all signals from those sectors of the main antenna having gain levels less than the low gain antenna. A gain control in the low gain antenna channel allows for adjustment of the degree of sidelobe cancellation attained. By comparing the signal levels from the two antennas, it can be determined if the signal is coming from the main beam or the sidelobes.

Figure 1:
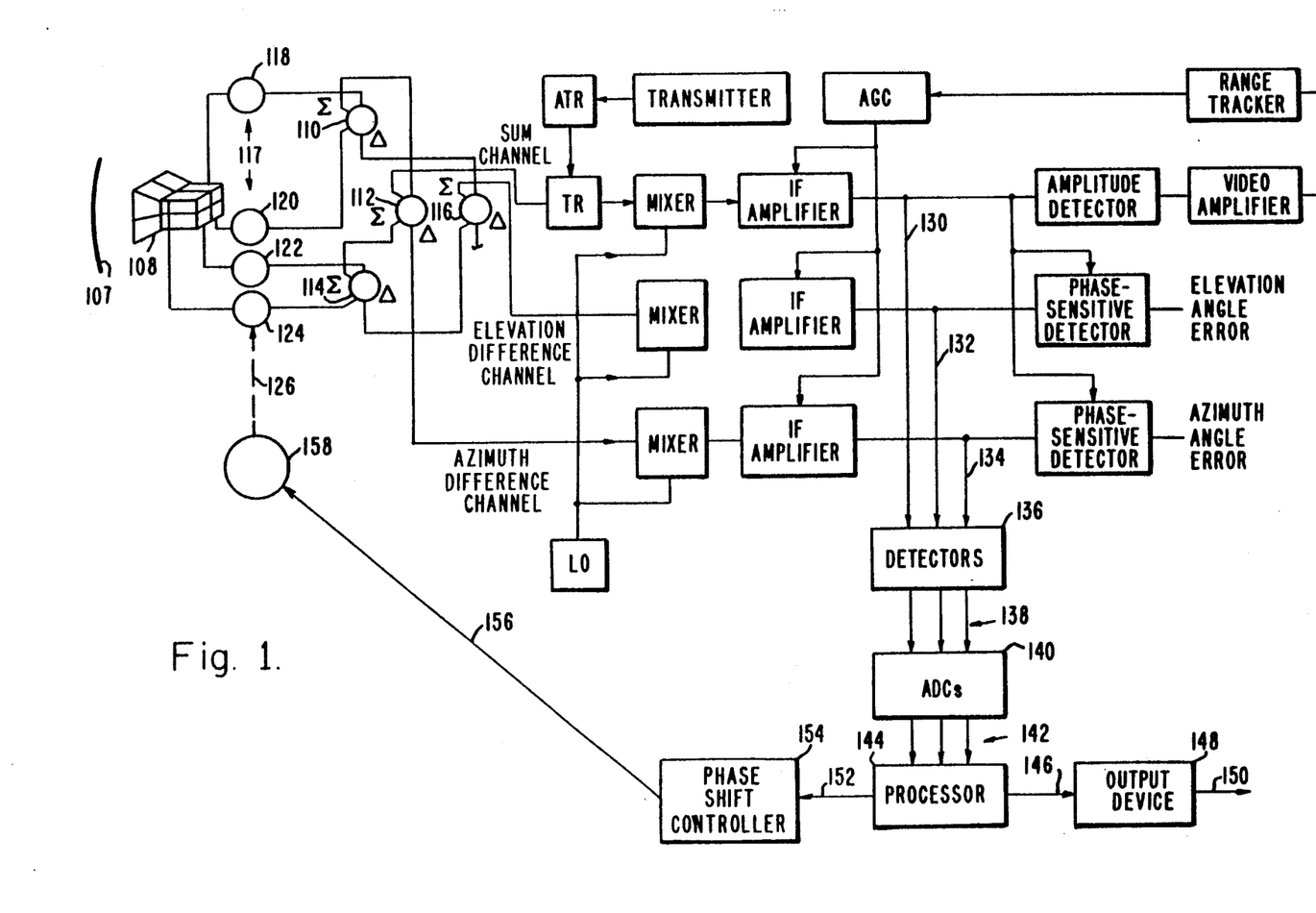
FIG. 1 is a block diagram representation of a monopulse radar tracking system that incorporates the principles of the present invention.

FIG. 1 is a block diagram of a radar tracking system that incorporates angle of arrival aspects in accordance with the principles of the present invention. However, although the present invention is described with reference to a tracking system, it addresses angle of arrival accuracy and resolution of ambiguity, and not radar tracking per se. The system of FIG. 1 includes components of the system shown in FIG. 15 of the above-cited Skolnik reference. In addition to the components shown in FIG. 15, the system of FIG. 1 includes an antenna reflector 107, phase shifters 117, detectors 136, analog to digital converters (ADCs) 140, processor 144, output device 148, phase shift controller 154, actuator 158, and signal lines associated therewith. Also, FIG. 15 has been further modified, where the feed horns have been changed to feeds 108 and reflector 107 and the angle error tracking operation has been changed to angle of arrival operation.

Figure 2:
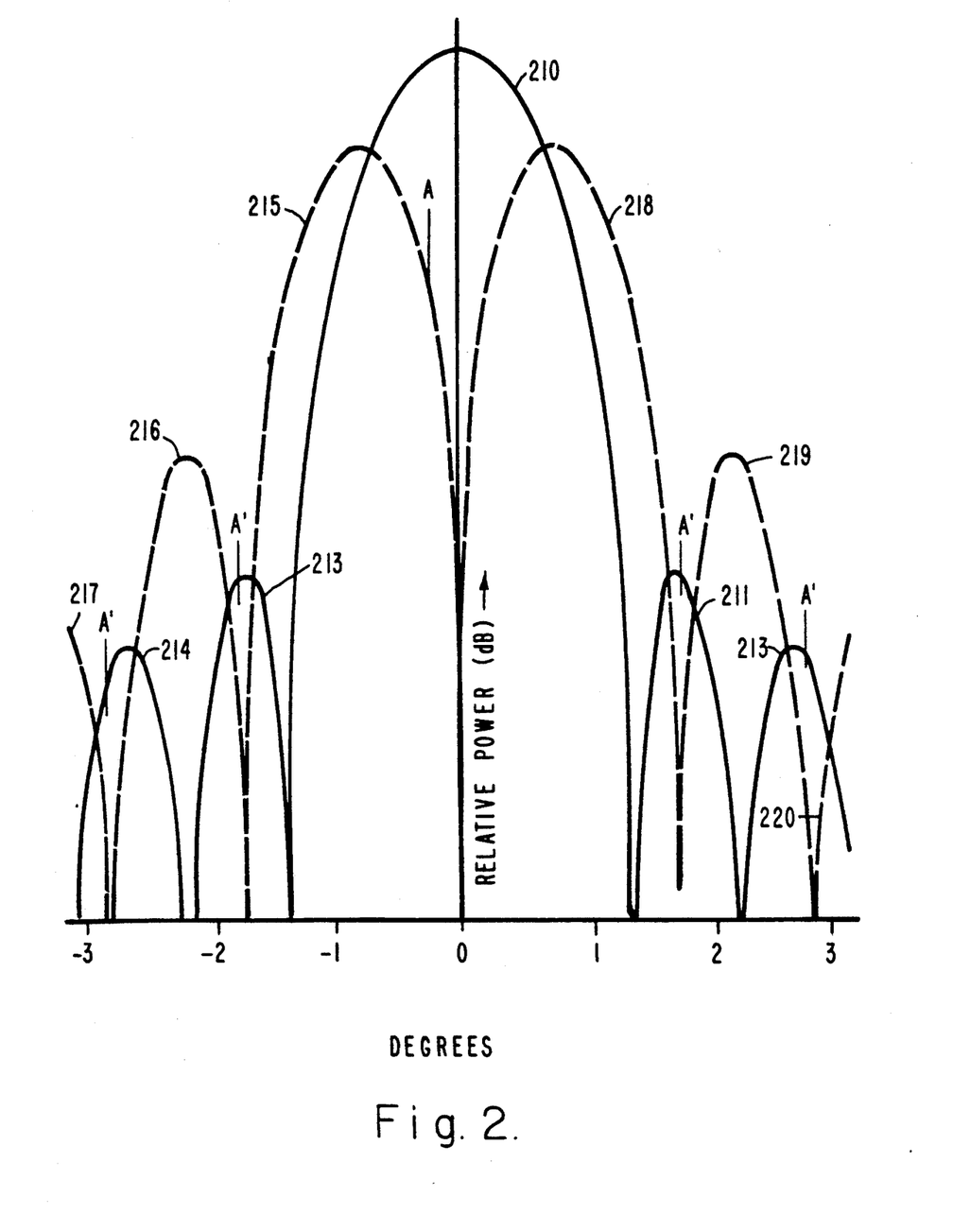
FIG. 2 represents antenna sum and difference patterns generated by the system of FIG. 1.
Figure 3:
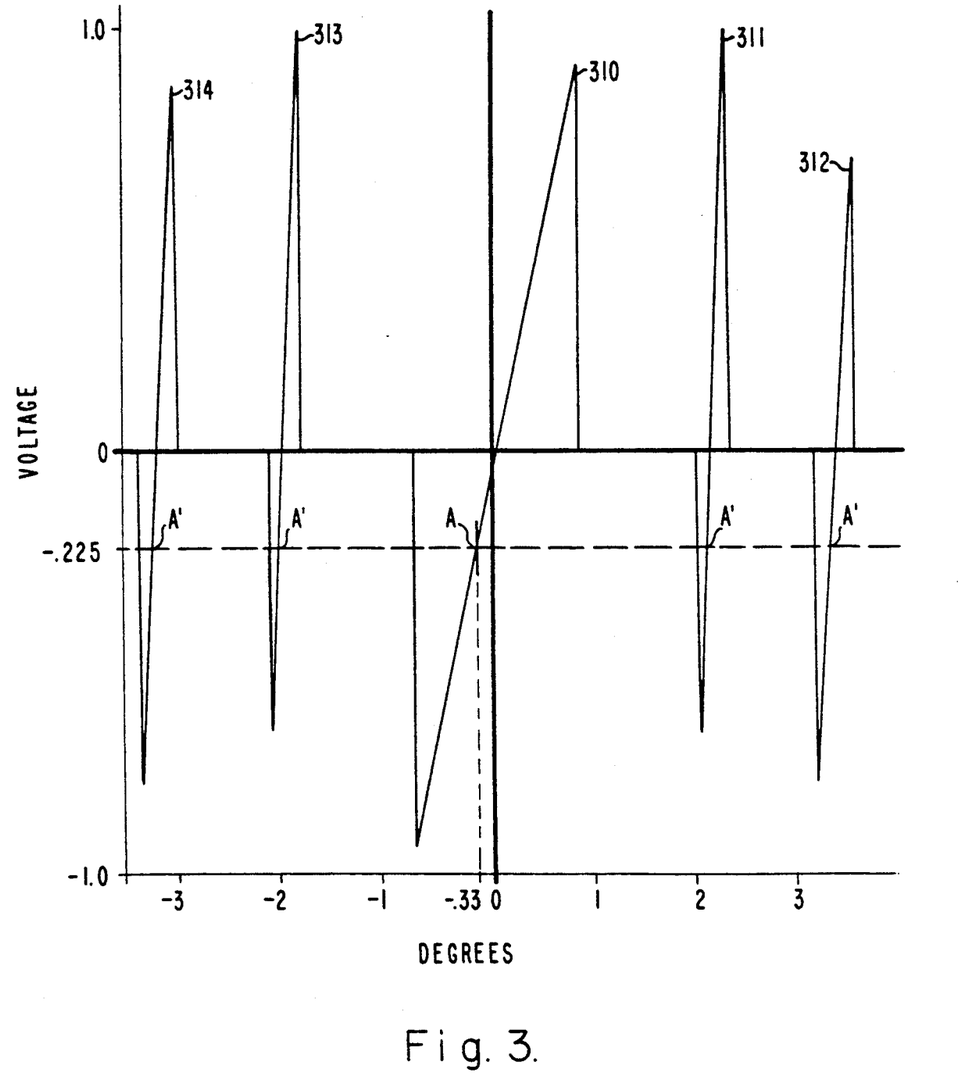
FIG. 3 represents an error voltage versus angle off boresight pattern derived from the sum and difference patterns shown in FIG. 2.
Figure 4:
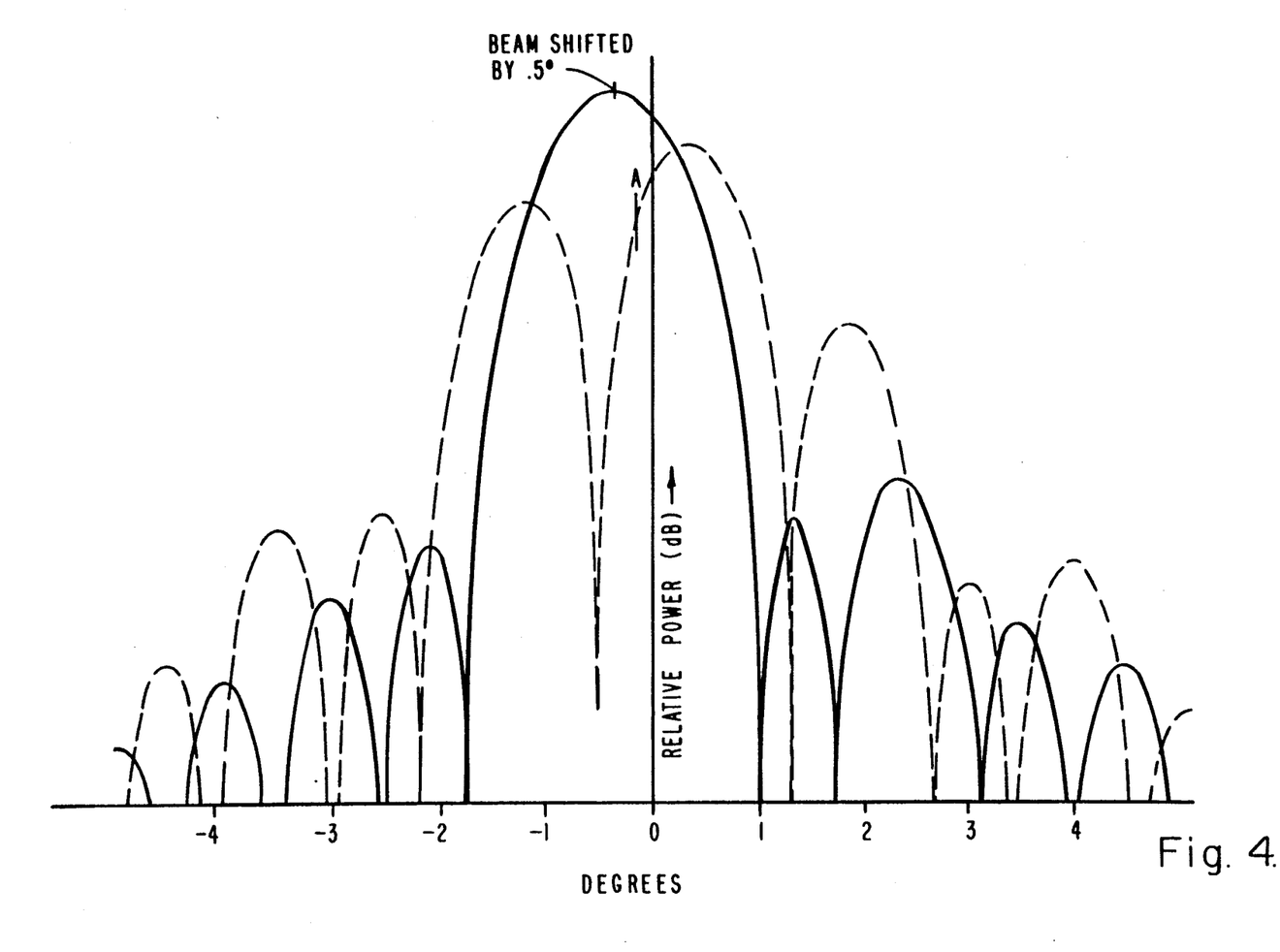
FIG. 4 represents antenna sum and difference patterns generated by the system of FIG. 1 subsequent to a beam shift.
Figure 5:
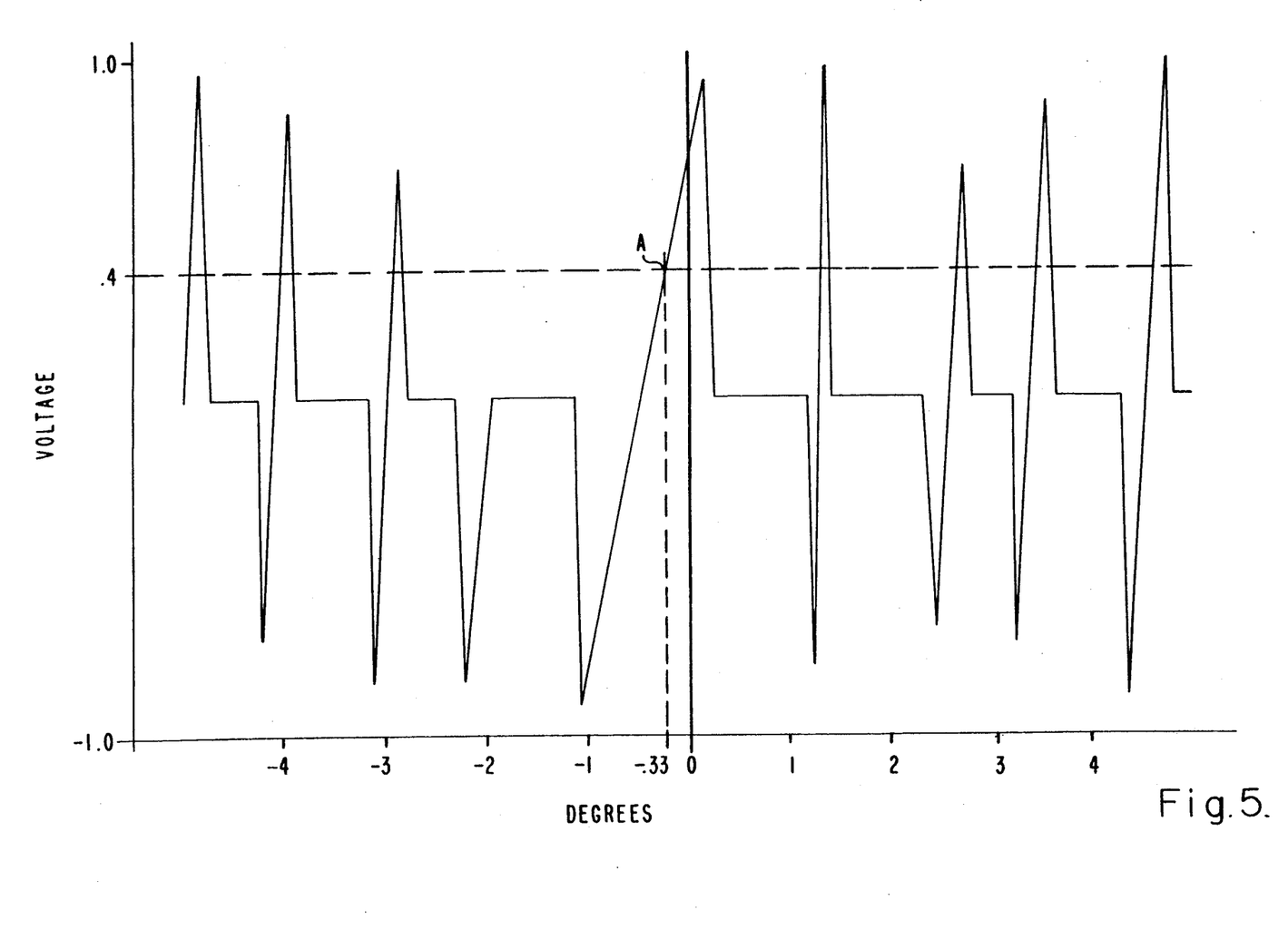
FIG. 5 represents an error voltage versus angle off boresight pattern derived from the sum and difference patterns shown in FIG. 4.

FIGS. 2 and 4 represent monopulse antenna patterns and FIGS. 3 and 5 represent error angle voltage curves for a single axis. Such antenna patterns are generated in multiple dimensions is quadrature, such as for an azimuth axis and for an elevation axis. FIG. 2 shows a main beam sum pattern 210 and its sidelobes 211-214. FIG. 2 further shows the difference main beam patterns 215, 218 and their sidelobes 216, 217, 219, 220.

With reference to FIG. 3, signal processing is conventionally performed on the sum and difference signals to generate error or angle of arrival signals, which are shown plotted as "S-curves" 310-314 or voltage versus angle offset patterns. The steeper S-curves 311-314 are due to sidelobes. These S-curves 310-314 have components related to a main beam (curve 310) and also have components related to one or more sidelobes (curves 311-314). Referring to FIG. 2, a particular angle error quotient may apply to a signal sensed at the angle related to point A on main positive difference beam 215 and may apply to a signal sensed at the angles related to points A' on the sidelobes 211-214. Therefore, the signal A associated with the main beam 215 is not readily distinguishable from signal A' associated with the sidelobes 311-314. Hence, there is ambiguity as to the actual angle of arrival.

In accordance with the principles of the present invention, the phase shifters 117 are used to shift the antenna beam so that the beam position is shifted relative to the direction of an event or signal of interest. An operator viewing a display, or a signal processor, evaluates the angle of arrival signals. Proper evaluation of the angle of arrival signals is used to resolve sidelobe ambiguities and increase the angle of arrival measurement accuracy. The phase shifters 117, comprising phase shifters 118, 120, 122, and 124, are implemented to provide any desired phase shift and resultant beam shift. For example, the beam is on boresight at the 0° phase shift setting, and a phase shift of 45° may be implemented to shift the beam a quarter of a beamwidth, for example. Beam shifts from a quarter to a half beamwidth have been found to be appropriate for angle of arrival systems.

In operation, the beam is set on boresight with all phase shifters 117 set to 0°, for example, and the angle of arrival measurements are made. When a particular event of interest occurs, the angle of arrival is measured and the phase shift is then changed to 45°, for example, causing the beam to shift, and the resultant angle of arrival of the event is again measured. When the phase shift is changed, the sum and difference patterns of FIG. 2 will shift relative to each other and relative to the zero degree axis. Because the S-curve for the main beam is different from the S-curves of the sidelobes, the S-curve of the main beam shift behaves differently from that of the sidelobes. The phase shift change (S-curve change) causes the angle of arrival of an event that is related to a sidelobe to change in amplitude significantly more than the angle of arrival of an event that is related to the main beam. This is because the sidelobes are narrower than the main beam and hence are closer together in angular displacement.

In summary, the present invention provides an improved angle of arrival measurement technique for monopulse antenna systems employing phase shifters on each of the four feeds to resolve ambiguities and to increase the angle of arrival accuracy. With reference to FIG. 1, the sum pattern is generated by taking the sum of the four feeds and the difference patterns by either taking the difference between the diagonal feeds or by taking the difference of the two adjacent pair of feeds in accordance with the following equations: $\rightarrow = A+B+C+D$, and $\Delta 1 = A-D$ and $\Delta 2 = C-B$, or $\Delta 1 = (A+C) + (B+D)$ and $\Delta 2 = (A+B) - (C+D)$. FIG. 2 shows the calculated sum and difference pattern for a given $120\lambda$ antenna connected to achieve monopulse operation. Because of the multiple lobes, there are ambiguities in the angle of arrival measurements, in that the signal coming from A cannot be distinguished from the signal coming from A'.

The closest sidelobes are the highest and the far out sidelobes are lower in amplitude and the signal to noise ratio is marginal at best. The angle of arrival receiver of FIG. 1 takes the $\Delta/\Sigma$ ratio, normalizes the voltage amplitude, gates the circuit to $\Sigma > \Delta$. An example of the resultant normalized angle-error voltage is shown in FIG. 3. The A voltage is say $-0.225$ volts and the angle is $-0.33°$. There are several ambiguity angles that give $-0.225$ volts although far out ones may not be distinguishable due to the noise. The logic employed to discern the angle of arrival assumes that the signal is received at an angle A. If the beam is shifted toward A by a given amount, say $+0.5°$ for this case, the signal appears at A in FIG. 4. The resultant normalized angle-error voltage is now $+0.4$ volts, as shown in FIG. 5, and it is in the major beam and signal-to-noise ratio should be approximately the same. If neither condition holds, the signal is assumed arriving from the sidelobes. Note that there are no corresponding sidelobe angles that fit the shifted sidelobe angles in FIG. 5. Another important point is that the two readings will increase the angle of arrival measuring accuracy by a factor of two. Additional phase shifts can be added to obtain finer accuracy.

Monitoring and evaluation may be performed in various ways, such as manually by an operator that views a display of angle of arrival signal amplitude and mentally evaluates the conditions, or automatically by the processor 144 that processes the angle of arrival signal amplitude and computationally evaluates the conditions, such as in the system shown in FIG. 1. The determination of whether the event is generated by a main beam or by a sidelobe may be made in various ways. For example, an operator that is familiar with event changes as a function of phase angle changes makes such a determination using the S-curves. Also, an operator may be prompted by information regarding event changes as a function of phase angle changes, such as by printed material or by a computer display, to make such a determination. Also, the processor 144 may be implemented to measure event changes as a function of phase angle changes and make the determination. Note that only the S-curve of the main beam is required.

In the system of FIG. 1, the IF sum signal 130 and the IF difference signals 132, 134 are converted to DC angle of arrival signals or S-curve signals 138 by detectors 136 implemented as angle of arrival detectors, and the DC analog signals 138 are converted to digital angle of arrival signals 142 by ADCs 140. The digital angle of arrival signals 142 are processed by the digital processor 144 to generate the output signals 146. The output signals 146 are provided to the output device 148 which generates the output signal 150. The digital processor 144 also generates output signals 152 that are provided the phase shift controller 154. The phase shift controller 154 in turn generates actuator control signals 156 to control the phase shifters 117.

The arrangement shown in FIG. 1 maintains the signals from the three channels separate until they are input to the processor 144. The processor 144 may be implemented to check that the sum signal is larger than the difference signals, to divide each of the difference signals by the sum signal to derive the quotient angle of arrival signals, and then to resolve the ambiguity of the sidelobe and main beam signals. Alternatively, the detectors 136 can be implemented to check that the sum signal is larger than the difference signals and to divide each of the difference signals by the sum signal to derive the quotient angle of arrival signals using well known analog computer circuits. The angle of arrival signals can then be converted to digital signals 142 by ADCs 140 and input to processor 144 to resolve the ambiguity of the sidelobe and main beam signals.

The processor 144 normally sets all the plane shifters equally, say 0°, which places the main beam on the boresight of the antenna (FIG. 2), and monitors for an event of interest. When an event is detected, the processor 144 records the voltage and determines the angle of arrival from the S-curve of the main beam 310 of FIG. 3 stored in memory. The processor 144 then sets the phase shifters 117 such that the beam is shifted, say by 0.5°, or a half a beamwidth, toward the event (FIG. 4), and again determines the angle of arrival from the S-curve of the main beam 310, (FIG. 5). These two readings, including subsequent additional readings, if desired, are averaged to increase the accuracy. If the event is not detected after shifting the beam, the event is assumed to have arrived from one of the sidelobes and is rejected.

In a manual embodiment, the angle of arrival signals are displayed to an operator by output device 148 generating display signal 150 and the operator manually controls the actuator 158 to select the phase conditions. As discussed above, the manual embodiment uses the detectors 136, the ADCs 140, and the processor 144 to generate angle of arrival signals and uses the processor 144 to generate display signals 146 to the output display device 148 to display the angle of arrival signals. The operator controls the phase shifters in response to the displayed information.

Alternatively, an operator may manually set the phase shifters 117 to the 0° beam position, and monitor the display signals 150 to detect the event. The display device 148 may be implemented to display angle of arrival signals, such as discussed relative to FIG. 3. When an event is detected, the operator records the angle of arrival from a bright dot on the S-curve. The operator then manually sets the phase shifters 117 to the second beam position, which shifts the S-curve by equal amounts. The bright dot should be on about the same spot on the display if the event arrived in the main beam. Because of the predictability of the amplitude and angle of arrival changes as a function of phase shift changes, amplitude and angle of arrival changes as a function of phase shift changes, or beam position, may be used for main beam and sidelobe ambiguity resolution. Because the beam can be shifted where the slope of the S-curve is linear, and because multiple readings may be made, the accuracy of the angle of arrival measurements can be increased.

Figure 6:
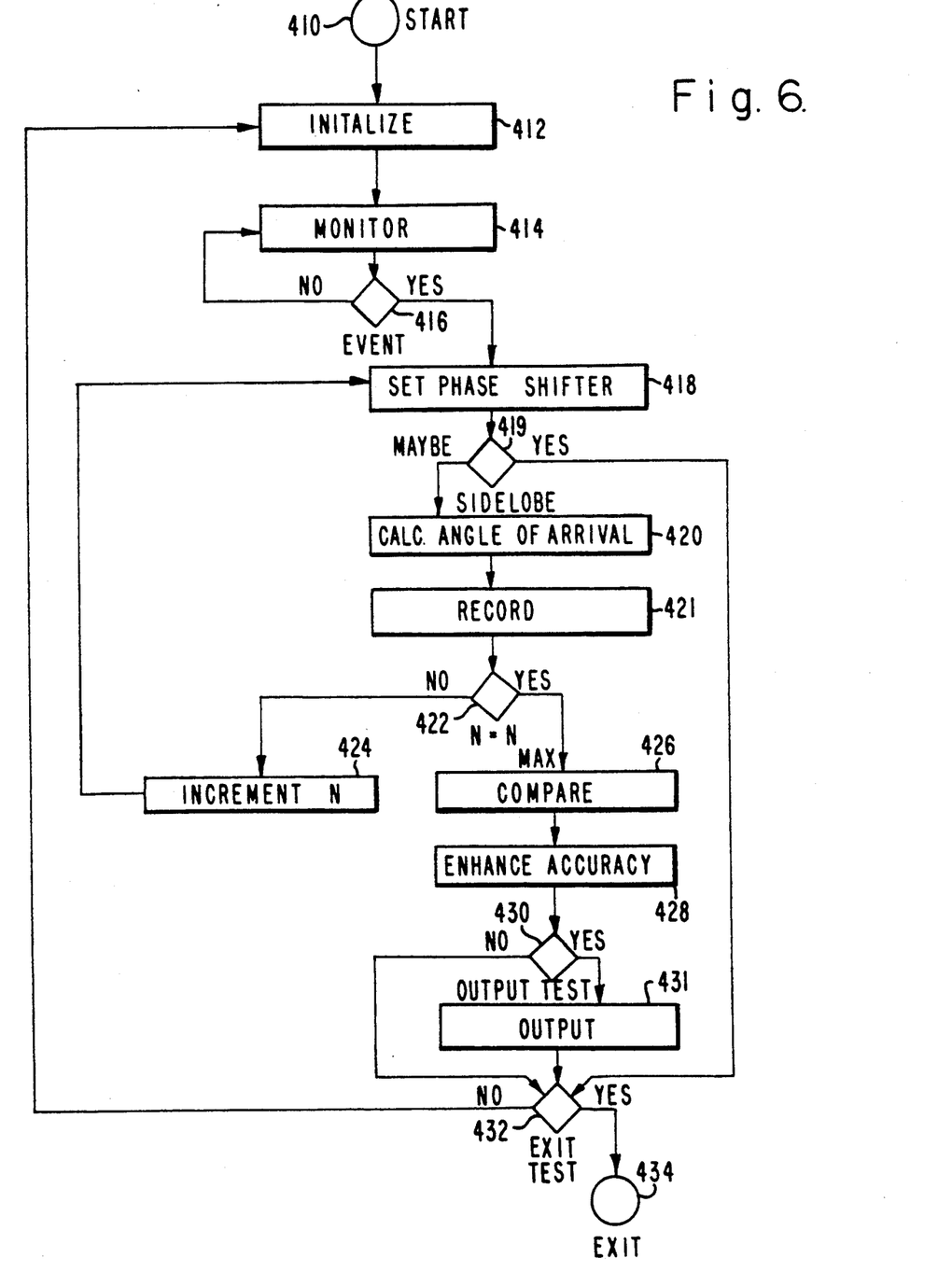
FIG. 6 is a flow diagram and state diagram illustrating procedures in accordance with the principles of the present invention.

A diagram is shown in FIG. 6 that may be implemented by a special purpose processor or a state machine as a state diagram, by a programmable processor as a program flow chart, by an operator as a manual operator procedure, or the like. For simplicity of discussion, FIG. 6 will be discussed in the context of a program flow chart, which is representative of the other implementations thereof. This FIG. 6 diagram is representative of the multitude of other state diagrams, program flow charts, operator procedures, and other methods and arrangements that can be implemented from the teachings herein.

The program starts in the START operation 410 and proceeds to the INITIALIZE operation 412 to initialize the parameters. Initialization includes setting the iteraction counter (N) to an initial condition (i.e., unity). The program then proceeds to the MONITOR operation 414 to monitor the input signals 142 for an event. A test is made in the EVENT operation 416 to determine if an event has been detected. If an event has not been detected in the EVENT operation 416, then the program proceeds along the NO path to loop back to the MONITOR operation 414 to continue to monitor for an event. If an event is detected in the EVENT operation 416, then the program proceeds along the YES path to the SET PHASE SHIFTER operation 418 to process the detected event.

In the SET PHASE SHIFTER operation 418, the processor 144 generates the control command signals 152 to command the phase shift controller 154 to generate the control signals 156. The control signals 156 cause the actuator 158 to set the phase shifter to the phase shift associated with the iteration number N is selected by actuator 154 controlling phase shifters 117.

The program then proceeds to the SIDELOBE operation 419 where the program checks to determine if the magnitude of the sum signal is equal to or greater than the magnitude of each of the difference signals. If the magnitude of the sum signal is less than the magnitude of each of the difference signals, a sidelobe condition is indicated, so the program branches along the YES path to the EXIT operation 432 to exit processing of the event as being a sidelobe condition. If the magnitude of the sum signal is greater than or equal to the magnitude of both of the difference signals, a sidelobe condition is possible but is not conclusive, so the program branches along the MAYBE path to the CALC. ANGLE OF ARRIVAL operation 420 to calculate the angle of arrival parameter. The program then proceeds to the RECORD operation 421 to record the angle of arrival parameter for subsequent sidelobe ambiguity determination and accuracy enhancement. These recordings include the amplitude, angle, and phase shift parameters for the particular iteration parameter N, for example.

The program then proceeds to the iteration control operation 422 to test the iteration number N to determine if the required number of iterations $N_{MAX}$ for the particular event have been completed. If the required number of iterations for the particular event have not been completed, the program branches along the NO path to increment the iteration counter "N" in the INCREMENT operation 424 and to loop back to the SET PHASE SHIFTER operation 418 to execute the next iteration in a manner similar to the execution of the previous iteration discussed above. If the required number of iterations for the particular event have been completed, the program branches along the YES path to the COMPARE operation 426 to compare the recorded information from the plurality of iterations for ambiguity resolution and for accuracy enhancement.

The COMPARE operation 426 can be implemented by comparing the recorded information with information in a table using a table lookup or other similar operation to resolve the ambiguity of the sidelobes and to determine the angle of arrival of the event. Alternatively, the comparison can be made by solving an equation relating or comparing the recorded event amplitude, event angle of arrival, and related phase shift from a plurality of iterations.

The program then proceeds to the ENHANCE ACCURACY operation 428 to enhance accuracy of the angle of arrival value, as discussed above. For example, the multiple angle of arrival parameters can be averaged to obtain an average angle of arrival parameters having an accuracy better than the accuracy of the individual angle of arrival parameters. For example, sidelobe related parameters, such as are determined in the COMPARE operation 426, are excluded from this averaging accuracy enhancement operation as being erroneous parameters.

The program then proceeds to the OUTPUT TEST operation 430 to determine if execution of an output operation is indicated by the comparison in the COMPARE operation 426. For example, if the comparison in the COMPARE operation 426 indicates that the event is a sidelobe event, then it may be desired to bypass execution of the output operation in the OUTPUT operation 431 by proceeding along the NO path from the the OUTPUT TEST operation 430 to the exit the EXIT TEST operation 432, and if the comparison in the COMPARE operation 426 indicates that the event is a main beam event, then it may be desired to execute the output the OUTPUT operation 431 by proceeding along the YES path from the OUTPUT TEST operation 430 to execute the OUTPUT operation 431 and then to proceed to the EXIT TEST operation 432. Alternatively, if the comparison in the COMPARE operation 426 indicates that the event amplitude is below a predetermined threshold, then it may be desired to bypass execution of the OUTPUT operation 431 by proceeding along the NO path from the OUTPUT TEST operation 430 to the EXIT operation 432, and if the comparison in the COMPARE operation 426 indicates that the event is at or above a predetermined threshold, then it may be desired to execute the OUTPUT operation 431 by proceeding along the YES path from the OUTPUT TEST operation 430 to execute the OUTPUT operation 431 and then to proceed to the EXIT TEST operation 432.

The EXIT TEST operation 432 is used to determine if it is appropriate to exit the program. If it is not appropriate to exit the program, the program branches along the NO path to loop back to again initialize the program in the INITIALIZE operation 412 and to then again execute the program. If it is appropriate to exit the program, the program branches along the YES path to exit the program through the EXIT operation 434.

It is to be understood that the above-described embodiments are illustrative of some of the many specific embodiments that represent applications of the principles of the present invention. Clearly, numerous and varied other arrangements may be designed by those skilled in the art without departing from the scope of the invention. For example, monitoring and evaluation of angle of arrival signals as a function of phase modulation is discussed herein for convenience of illustration. However, other signals are also modulated by phase angle changes and hence other signals, as an alternative to or in addition to angle of arrival signals, may be used for such monitoring and evaluation. Also, a single dimension or channel of operation, i.e., azimuth or elevation, is discussed herein for convenience of illustration. However, it is intended that multiple dimensions or channels of operation be implemented together in the same system.

The present invention is applicable to the wide range of microwave systems, such as surveillance, radar, and communications, and the like. Although the foregoing discussions are specific to a monopulse antenna system, the teachings of the present invention can readily be adapted to sequential lobing, mechanical scanned systems, and other well known radar type systems and the teachings of the present invention may be readily adapted for use in combination with sidelobe suppression, sidelobe blanking, and other antenna features. Further, although the foregoing discussions are specific to a plurality of parallel channels of processing having a plurality of phase shifters, the circuits can readily be time shared. For example, a single hardware channel consisting of a pair of phase shifters, a hybrid junction, a mixer, an IF amplifier, detectors, and ADCs can be time shared between a plurality of channels; such as a sum channel, an elevation channel, and an azimuth channel. Still further, although the foregoing discussions are specific to shared channels of processing having a single processor, a single output device, and a single phase shift controller time shared between multiple channels, these devices can be readily implemented in parallel form with separate devices dedicated to each of a plurality of channels. Yet further, although the foregoing discussions are specific to multiple channels all having the same amount of phase shift, configurations may be provided having different phase shifts for each of a plurality of channels.

What is claimed is:

1. A method of providing an angle of arrival measurements having improved accuracy and resolved sidelobe ambiguity in a monopulse antenna system, said method comprising the steps of:
   determining the presence of a supposed signal of interest received by the monopulse antenna system;
   monitoring the angle of arrival of the supposed signal of interest;
   discriminating whether the supposed signal of interest is on the beam main lobe or a sidelobe to resolve sidelobe ambiguity by phase shifting the antenna beam to steer the beam main lobe relative to the supposed signal of interest such that the angle of arrival of the signal of interest should remain in the main lobe subsequent to the phase shift; and
   monitoring the angle of arrival of the supposed signal of interest to determine if the signal of interest remains on the main lobe;
   whereby if the position of the signal of interest remains on the main lobe, sidelobe ambiguity has been resolved, and if the position of the signal of interest is on a sidelobe, the signal of interest is not detectable and sidelobe ambiguity has been resolved.

2. The method of claim 1 further comprising the steps of:
   applying additional phase shifts to the antenna system to steer the beam main lobe relative to the signal of interest such that the angle of arrival of the signal of interest remains in the main lobe subsequent to the phase shift; and
   monitoring the angle of arrival of the signal of interest to more accurately determine the angle of arrival of the signal of interest as a result of the additional phase shifts.

3. The method of claim 1 further comprising the steps of:
   applying additional phase shifts to the antenna system to steer the beam main lobe towards the supposed signal of interest such that the angle of arrival of the signal of interest should remain in the main lobe subsequent to the phase shift; and
   monitoring the angle of arrival of the supposed signal of interest to determine if the signal of interest remains on the main lobe.

4. The method of claim 3 further comprising the steps of:
   applying additional phase shifts to the antenna system to steer the beam main lobe towards the signal of interest such that the angle of arrival of the signal of interest remains in the main lobe subsequent to the phase shift; and
   monitoring the angle of arrival of the signal of interest to more accurately determine the angle of arrival of the signal of interest as a result of the additional phase shifts.

5. In an angle of arrival microwave system having an antenna for generating a plurality of antenna signals, phase shift means for steering the antenna beam, and means for processing the antenna signals to generate angle of arrival signals, a method or resolving sidelobe ambiguity comprising the steps of:
   generating a first antenna beam by setting the phase shifters at a first phase shift value;
   generating an angle of arrival signal corresponding to a signal of interest that is a function of the first phase shift value;
   discriminating whether the supposed signal of interest is on the beam main lobe or a sidelobe to resolve sidelobe ambiguity by shifting the phase of the antenna signals from the first phase shift value to a second phase shift value such that the angle of arrival of the signal of interest should remain in the main lobe of the antenna beam subsequent to the phase shift;
   generating an angle of arrival signal corresponding to the signal of interest that is a function of the second phase shift value; and
   determining if the the two angle of arrival signals are substantially the same for the two phase shift values;
   whereby if the signal of interest remains on the main lobe subsequent to the phase shift, the angle of arrival is determined and sidelobe ambiguity has been resolved, and if the signal of interest is on a sidelobe the signal of interest is not detectable subsequent to the phase shift and sidelobe ambiguity has been resolved.

6. The method of claim 5 further comprising the steps of:
   applying additional phase shifts to steer the beam main lobe relative to the signal of interest such that the angle of arrival of the interest remains in the main lobe subsequent to the phase shift; and
   monitoring the angle of arrival of the signal of interest to more accurately determine the angle of arrival of the signal of interest as a result of the additional phase shifts.

7. The method of claim 5 further comprising the steps of:
   applying additional phase shifts to steer the beam main lobe towards the supposed signal of interest such that the angle of arrival of the signal of interest should remain in the main lobe subsequent to the phase shift; and
   monitoring the angle of arrival of the supposed signal of interest to determine if the signal of interest remains on the main lobe.

8. The method of claim 7 further comprising the steps of:
   applying additional phase shifts to steer the beam main lobe towards the signal of interest such that the angle of arrival of the signal of interest remains in the main lobe subsequent to the phase shift; and
   monitoring the angle of arrival of the signal of interest to more accurately determine the angle of arrival of the signal of interest as a result of the additional phase shifts.

* * * * *